United States Patent [19]

Cowing

[11] Patent Number: 5,035,046

[45] Date of Patent: Jul. 30, 1991

[54] DEVICE FOR ASSEMBLING LOUVER WINDOWS AND DOORS

[75] Inventor: Richard W. Cowing, Aurora, Canada

[73] Assignee: Sturdi-Built Wood Products Limited, Markham, Canada

[21] Appl. No.: 553,549

[22] Filed: Jul. 16, 1990

[51] Int. Cl.⁵ .............................................. B23P 21/00
[52] U.S. Cl. .................................... 29/714; 29/281.1; 29/709; 29/281.5; 49/506
[58] Field of Search ..................... 29/281.1, 281.5, 709, 29/714, 718; 49/506

[56] References Cited

U.S. PATENT DOCUMENTS

| 2,761,185 | 9/1956 | Sherwood | 49/506 |
| 2,934,818 | 5/1960 | Challoner et al. | 29/714 |
| 3,011,248 | 12/1961 | Gilkey | 29/718 |
| 3,032,866 | 5/1962 | Nathan | 29/718 |

Primary Examiner—P. W. Echols
Assistant Examiner—David P. Bryant

[57] ABSTRACT

An apparatus for assembling a louvered window or door fitting structure comprises first and second spaced apart style guides in parallel relationship to one another, dowel receiving members to the inside of each style guide and a motor for moving at least the first style guide towards the second style guide while maintaining their parallel relationship to clamp the styles to the louvers of the louvered window or door structure. The dowel receiving members guide the dowels on the louvers into the openings in the styles as the structure is clamped by the style guides. The motor then moves at least the first style guide away from the second style guide to allow releasing of the structure from the apparatus.

7 Claims, 5 Drawing Sheets

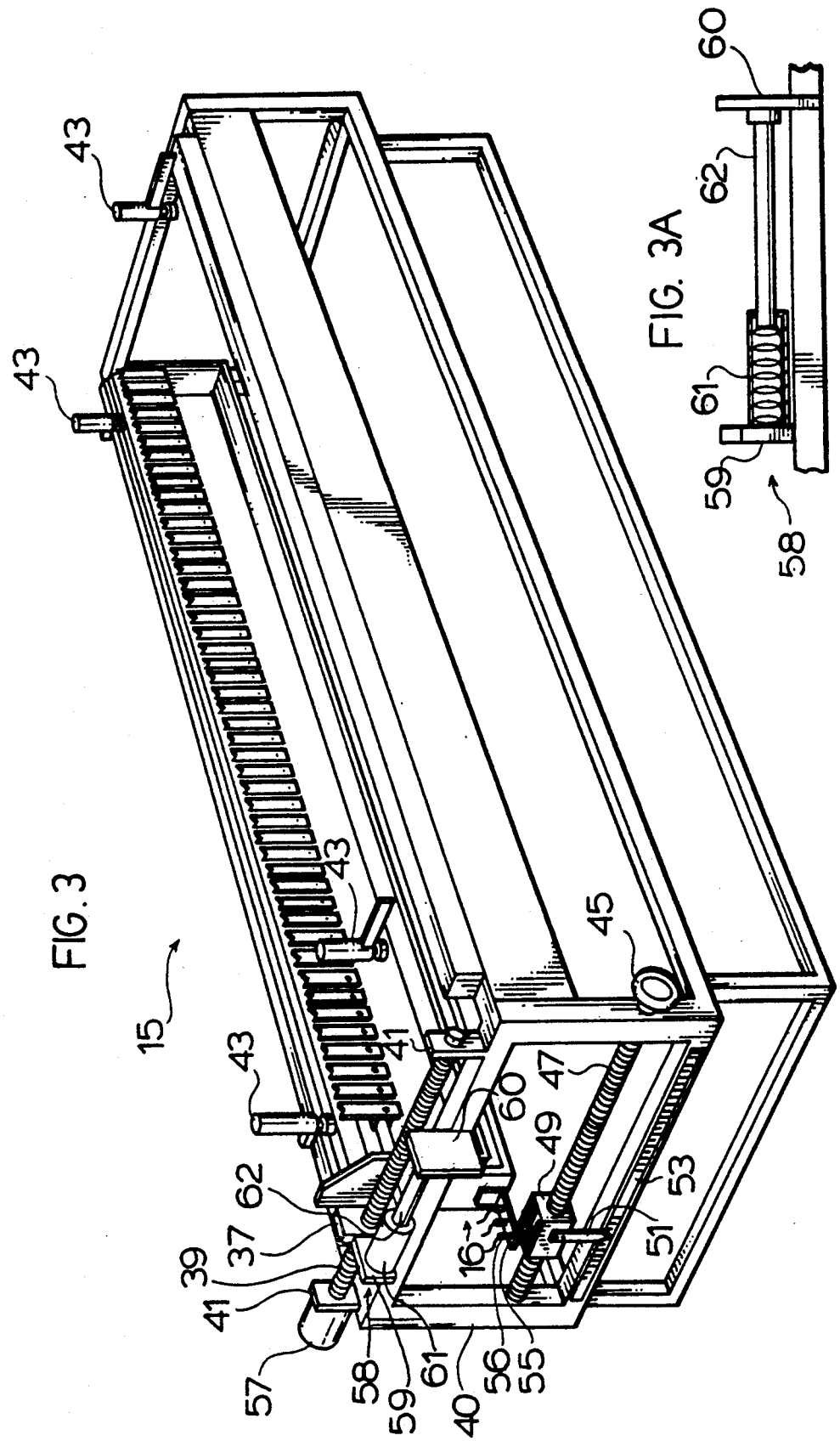

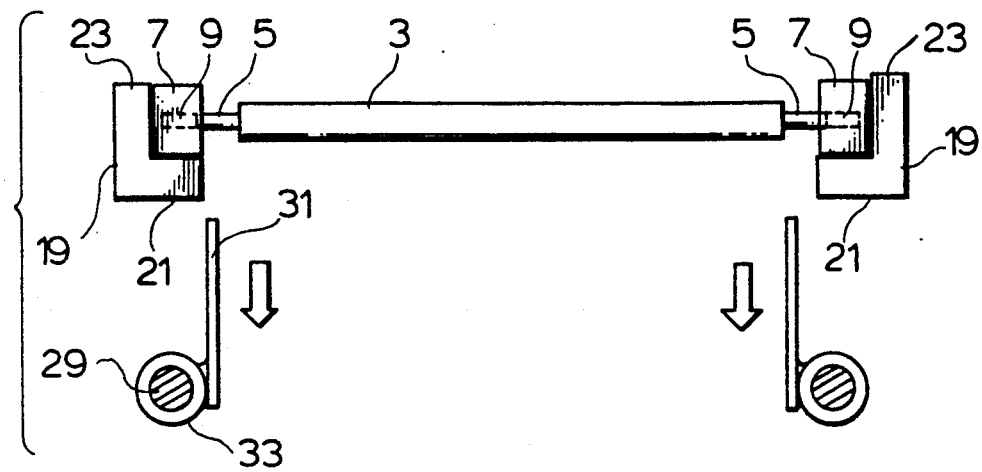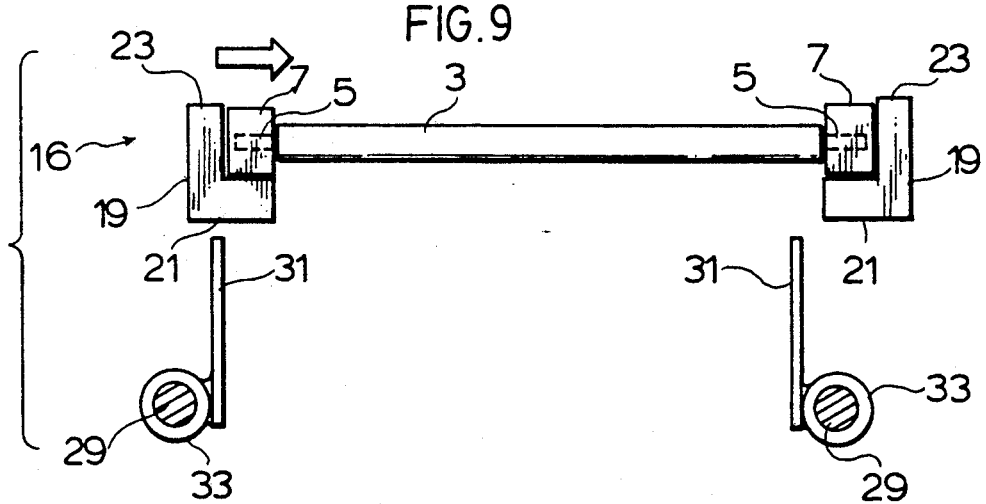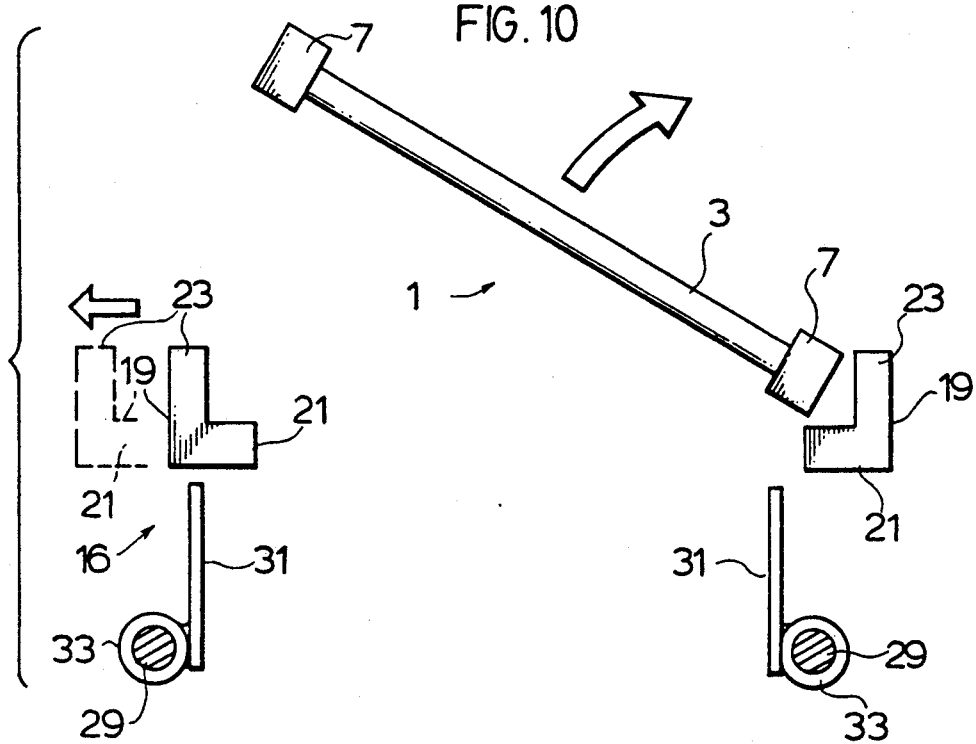

DEVICE FOR ASSEMBLING LOUVER WINDOWS AND DOORS

FIELD OF THE INVENTION

The present invention relates to a motorized apparatus for assembling a louvered window or door fitting structure.

BACKGROUND OF THE INVENTION

Door and window fittings with movable louvers have been available for a number of years. These types of louvered structures comprises an outside frame formed from what are known in the trade as styles used to support the movable louvers. The louvers themselves include opposite end dowels for fitting into holes or openings within the styles.

Even though louvered window fittings and door structures have been around for quite some time and they are becoming ever more popular, the actual assembling of these structures is still very backward. Quite simply, the styles are placed on two or more hand operated vises and the louvers are manually lined up with the styles. The vises are then adjusted independently of one another until the styles have been clamped to the louvers.

The above manual process is extremely time consuming and adds substantially to the cost of louvered window and door fitting structures. Furthermore, as a result of the manual adjustment of the vises, there is often difficulty in obtaining an accurate fit between the louvers and the styles which in turn results in loose sloppy play at some of the louvers and binding relative to the styles at others of the louvers.

SUMMARY OF THE PRESENT INVENTION

The present invention provides a new apparatus for accurate assembly of a louvered window or door fitting structure where the structure includes side support styles and louvers having opposite end dowels for fitting into the styles. The apparatus itself comprises first and second style guides in parallel relationship to one another, dowel receiving means to the inside of each of the style guides and a motor for moving at least the first style guide towards the second style guide while maintaining the parallel relationship therebetween to clamp the styles fitted in the style guides to the louvers supported by the dowel receiving means. During the clamping, the dowel receiving means guide the dowels on the louvers into the openings in the styles. The motor then moves at least the first style guide away from the second style guide to allow releasing of the structure from the apparatus.

BRIEF DESCRIPTION OF THE DRAWINGS

The above as well as other advantages and features of the present invention will be described in detail according to the preferred embodiments of the present invention in which;

FIG. 3 is a perspective view of an apparatus according to a preferred embodiment of the present invention to assemble the louvered structure of FIG. 1;

FIG. 3A is a partially sectioned view of a pressure switch used in the apparatus of FIG. 3.

FIGS. 6 through 10 are simplistic sectional views showing the operation of the apparatus of FIG. 3.

DETAILED DESCRIPTION ACCORDING TO THE PREFERRED EMBODIMENTS OF THE PRESENT INVENTION

Figure 1:
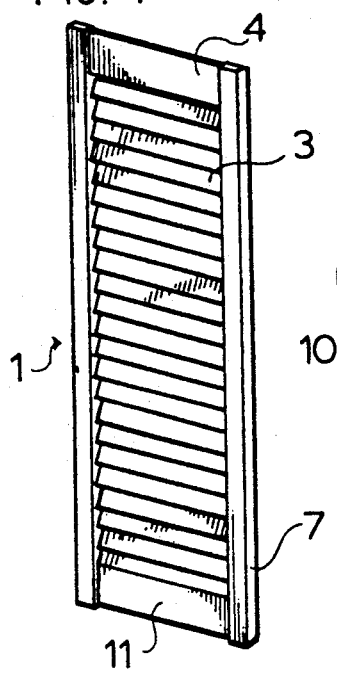
FIG. 1 is a perspective view of a louvered structure.

FIG. 1 shows a louvered structure generally indicated at 1. This louvered structure which is typically either in the form of a window shutter or an interior door is formed with a plurality of movable louvers 3 and a supporting frame comprising a pair of outside styles 7 and top and bottom rails 11.

Figure 2:
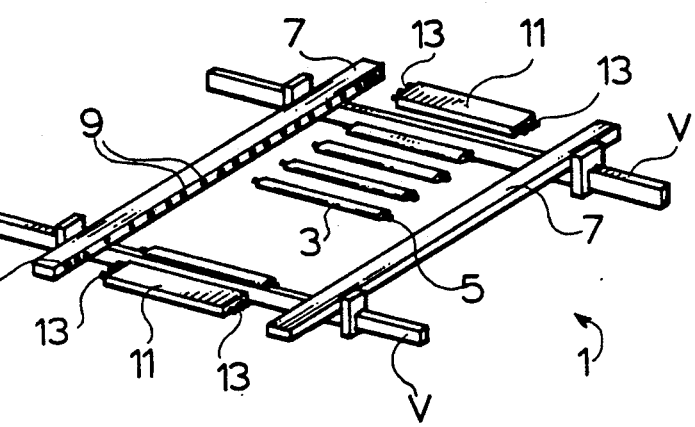
FIG. 2 is a perspective view of a prior art setup used to assemble the louvered structure of FIG. 1.

FIG. 2 shows a prior art setup used to assemble the structure of FIG. 1. In particular, this prior art set up includes a pair of vises V on which the two styles 7 are seated. These styles include a plurality of interior openings 9 and each of the louver 3 is provided with opposite end dowels 5. Again, according to the prior art assembly, the dowels on the louvers are manually fitted into the openings in the styles and then the vises V are tightened independently of one another to provide a final clamping of the structure.

Figure 4:
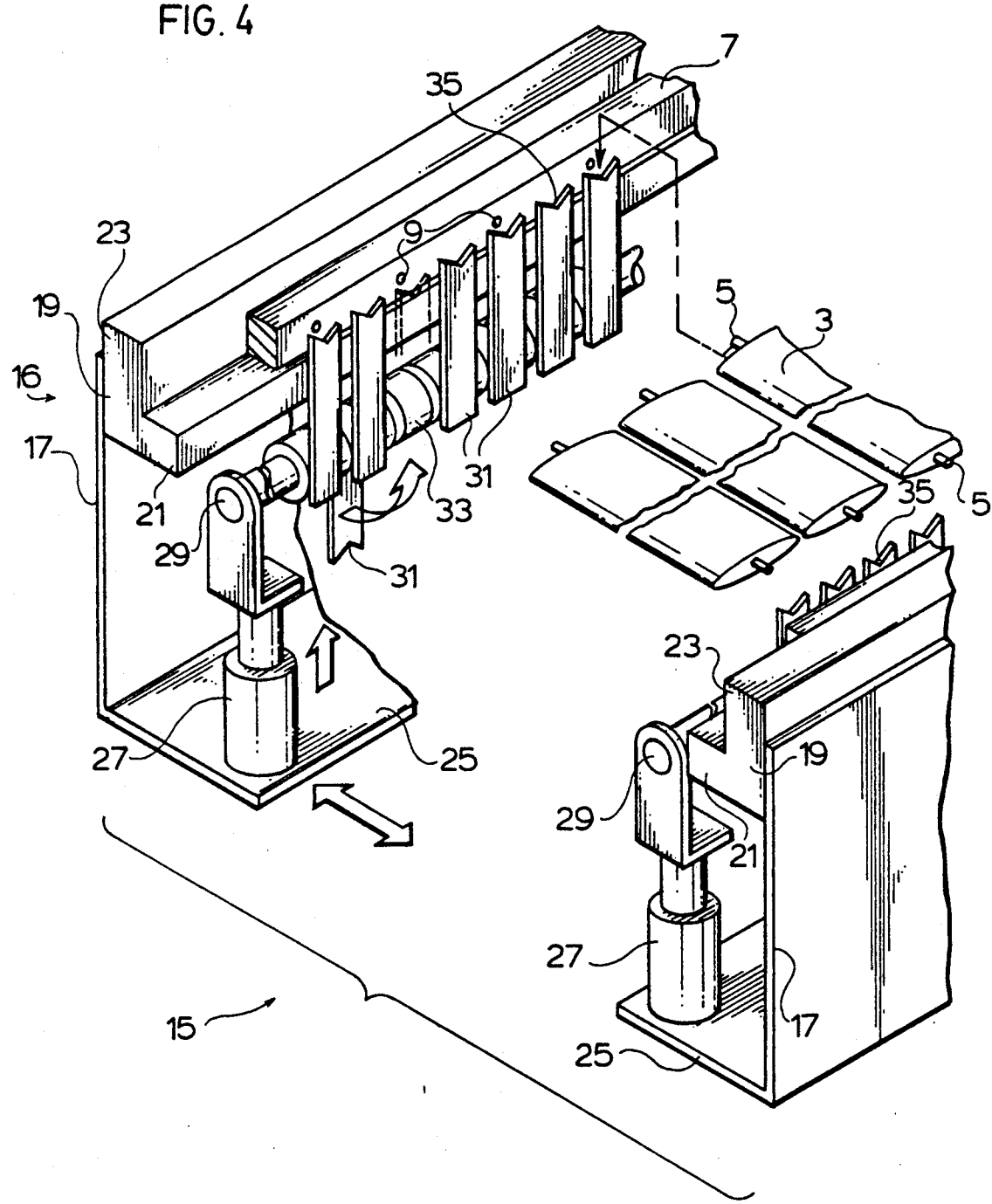
FIG. 4 is an enlarged perspective view of one end of the apparatus of FIG. 3.

FIG. 3 shows an apparatus generally indicated at 15 for a motorized assembly of the louvered structure of FIG. 1. Details of apparatus 15 are best seen with respect to FIG. 4 of the drawings. In particular, apparatus 15 comprises right and left hand frame portions 17 each of which is provided with a style guide 19. Each of the style guides has an L shaped configuration comprising a lower ledge 21 and an upright backing portion 23.

Each of the frame portions 17 further includes a lower platform 25 which supports a piston assembly 27. Fitted into each of the piston assemblies is an elongated rod 29 to which louver guides are mounted. These louver guides comprise a plurality of finger-like members 31 each one of which is independently mounted to rod 29 by collar member 33. The collar members allow independent up and down positioning of the finger members as shown for example in the left side of FIG. 4 where the first two fingers 31 are located in an upright position whereas the third finger 31 is turned to a down position. The reason for this independent positioning of the finger members will be described later in detail.

Each of the finger members 31 is provided with a V shaped cut out end 35 for receiving one of the dowels 5 at the outer end of one of the louvers 3.

Returning to FIG. 3 of the drawings, apparatus 15 further includes a plurality of clamps 43 at each of the style guides for clamping styles 7 onto the style guides.

The construction for motorized operation of apparatus 15 is best seen in FIG. 3 of the drawings. Although corresponding parts to the left and right hand side of the apparatus have been described above with identical numbers, the left hand side is indicated by the reference numeral 16 in FIGS. 3 through 10 of the drawings. This is only done to identify it as the movable side of the apparatus used to open and close the style guides relative to one another firstly in the clamping and then in the releasing of the louvered structure from the apparatus.

Secured to the frame 17 at the left side 16 of the apparatus is an L shaped bracket 37. A threaded rod 39 is threaded through bracket 37. Additional brackets 41 are secured to the main end frame 40 of the apparatus. Frame portion 17 at the left hand side 16 of the apparatus is movable relative to the end frame 40. In the set up described immediately above, rotation of rod 39 which produces movement of bracket 37 and frame 17 attached to that bracket is controlled by motor 57 mounted at the end of rod 39 as shown in FIG. 3 of the drawings.

Initial setup of the apparatus is provided by a very accurate manual adjustment control comprising a threaded rod 47 supported by end frame 40 of apparatus 15. This particular threaded rod is rotated by means of a hand control 45.

Movable along threaded rod 47 is a block-like member 49 which carries a downwardly pointing finger indicator 51. Provided along frame 40 is a measurement scale 53. Finger indicator 51 extends downwardly to a position immediately over scale 53. This scale and finger combination is used for a very accurate positioning of block 49 which is provided on its top surface with a plurality of sensors 50 as best shown in FIG. 5 of the drawings.

Figure 5:
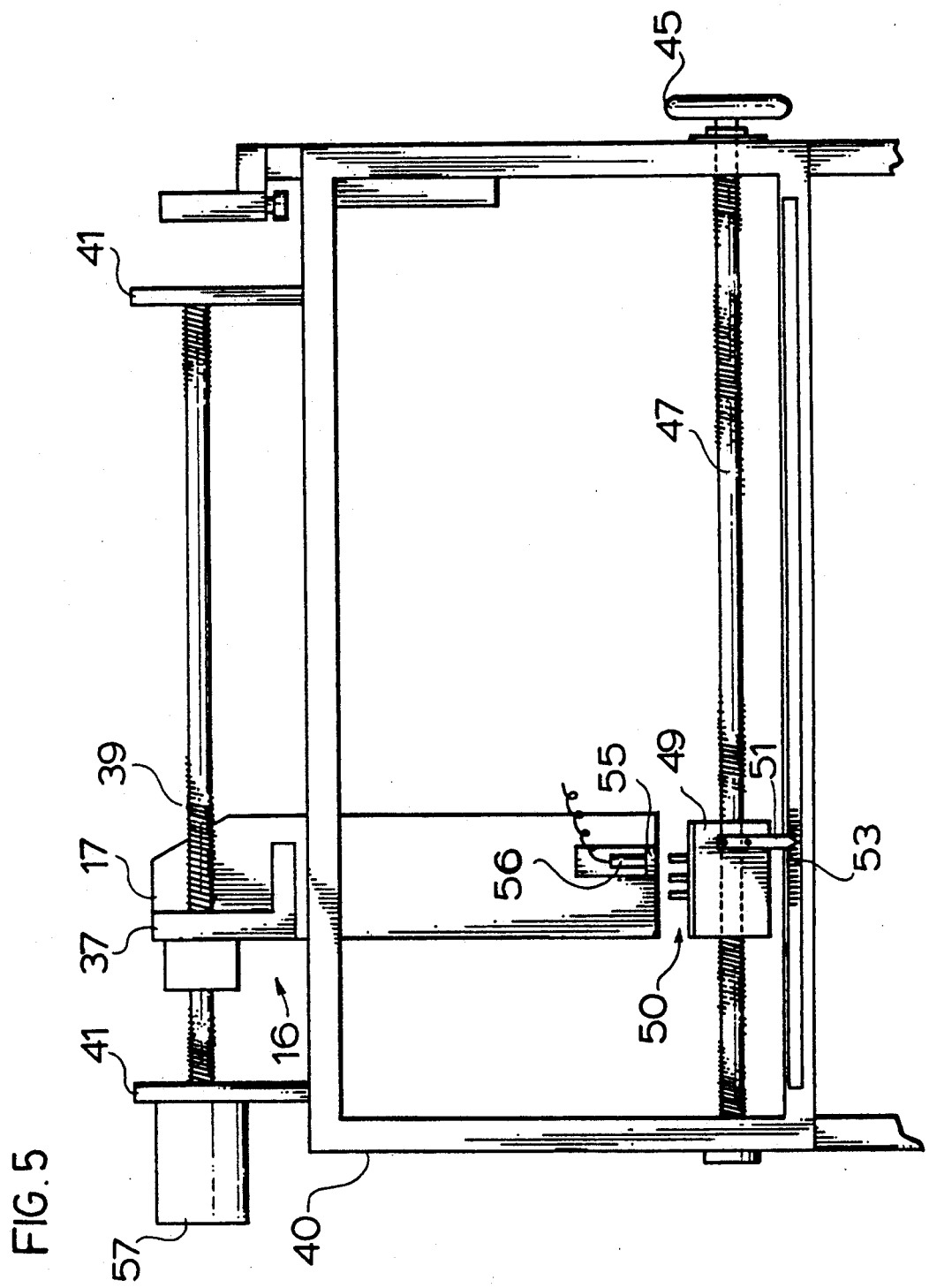
FIG. 5 is an end view of the apparatus of FIG. 3.

Extending outwardly from the side of frame portion 17 is a further L shaped bracket 55 which supports a plurality of switches 56 as shown in both FIGS. 3 and 5 of the drawings. The switches are provided on their bottom surfaces with sensor pickups which at different stages of operation of the apparatus align with and are responsive to sensors 50.

For initial set up of the apparatus styles 7 are fitted onto each of the style guides 19. The styles are supported from below by the ledge portions 21 on the style guides and to the outside by the upright leg 23 of each of the style guides. This is well shown in FIGS. 6 through 9 of the drawings.

The style guides are separated from one another by a distance slightly greater than the length across the end of rails 11 of the structure. These end rails include opposite end dowels 13 with corresponding openings 10 being provided in the styles for these dowels. The rails are installed by manually fitting dowels 13 into the holes 10 in the rail 9 at the movable left hand side of the apparatus. This holds the rail in position and motor 57 is then operated to rotate rod 39 which provides a very slight movement of the movable left hand style guide sufficient to push the dowels 13 at the right hand side of the rail slightly into the openings of the right hand style. The motor is automatically shut down at this point by switches 56 which move with the moving style guide. The switch pickups pass over and respond to sensors 50.

The louvers are supported in the apparatus by placing the opposite end dowels 5 in the grooved upper ends 35 of the dowel receiving fingers 31. Note that although the main bodies of the louvers and the rails are very similar in length, with the louver bodies being slightly shorter than the rail bodies to allow for rotation of the louvers after assembling, the rails have longer dowels so that the slight clamping described above does not cause insertion of the louver dowels into the styles. To effect this, fingers 31 are set in an upright position to align with the holes 9 in the styles 7 and the louver dowels are supported by the upright fingers 31 at each side of the apparatus. Typically, there are many more fingers 31 than there are holes 9 in the styles and therefore, there will be locations along the style where there is a dowel finger but no hole in the style. At these locations, the fingers are turned downwardly out of the way as earlier described. The reason for providing an excess number of fingers is that not all styles will be the same and therefore, the style hole pattern will vary from style to style which is accommodated through the provision of the numerous dowel fingers on the apparatus.

Figure 6:
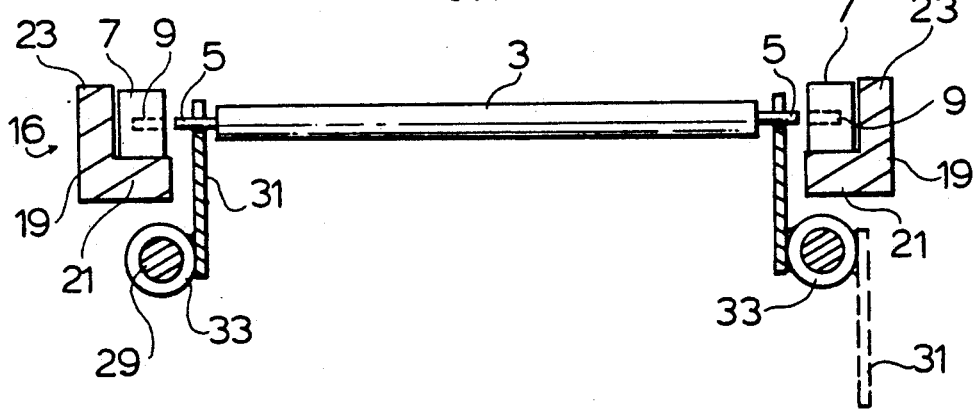

As noted above, the dowels on the louvers are shorter than the dowels on the rails and therefore, the initial clamping of the machine does not cause insertion of the louver dowels 5 into the openings 9 of the rails 7. Therefore, even after the rails have been initially set into the styles, the dowel fingers 31 are still required for proper alignment of the louver dowels 5 relative to style openings 9 as best seen in FIG. 6 of the drawings.

Figure 7:
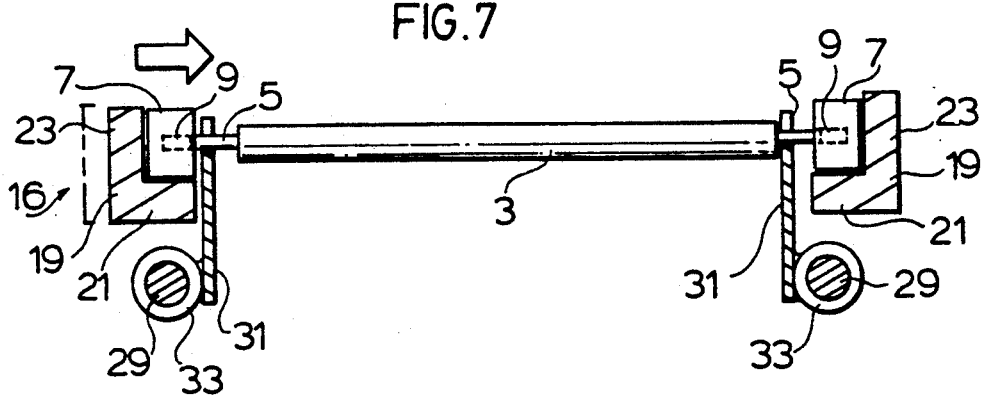

The next stage of operation of the apparatus is to once again turn on motor 57 which causes the frame portion 17 at the left hand side 16 of the apparatus to move inwardly driving the dowels 5 into the style openings 9 at both sides of the apparatus as shown in FIGS. 7 through 9 of the drawings. Note, as best seen in FIGS. 6 and 7, the style fingers 31 when in their upright position extend upwardly beyond the lower ledge 21 of the style guides 19 to place the dowels 5 in direct alignment with the style openings 9.

As soon as there is an initial insertion of the dowels 5 into the style openings 9, the piston assemblies 27 at both sides of the apparatus, which are also controlled by the sensors 50 and switches 56, pull rods 29 carrying the fingers 31 downwardly as shown in FIG. 8 of the drawings without interrupting operation of the motor. This clears the fingers out of the way and allows the full clamping of the styles to the louvers as shown in FIG. 9 of the drawings.

The apparatus is designed to take many different heights and widths of louvered structures and the manual adjustment of sensors 50 is used to accommodate in particular structures of different widths, i.e. the sensors 50 are positioned through the use of the indicator 51 and scale 53 for accurate staged operation of motor 57 according to the width of the structure to be assembled by the apparatus.

The apparatus further includes a pressure operated switch generally indicated at 58 shown in FIG. 3. The details of switch 58 are best seen in FIG. 3A. The switch includes two plates 59 and 60. Plate 58 moves with frame portion 17 while plate 60 is mounted in a fixed position on the end frame 40. A piston having a spring switch fitted housing 61 and a rod 62 is located between the two plates. The piston is compressed during the clamping operation increasing the pressure on the internal spring switch. When a preset pressure level is reached, the motor is automatically shut down at the final stage of assembly of the louvered structure to discontinue further clamping thereby avoiding damage to the now formed structure.

One of the keys to the present invention is that through the entire clamping operation, the style guides are always maintained in an exact parallel relationship to one another. The motorized movement of the one style guide assists in maintaining accuracy of the setup and ensures that there is a uniform fitting of all of the louvers relative to the styles.

After the clamping operation has been completed, the style guide to the left hand side 16 of the apparatus is moved outwardly away from the other style guide by operating motor 57 in the reverse direction to that described above, thereby allowing release of the completed structure from the apparatus as shown in FIG. 10 of the drawings.

Although various preferred embodiments of the invention have been described in detail, it will be appreciated by those skilled in the art that variations may be made without departing from the spirit of the invention or the scope of the appended claims.

The embodiments of the invention in which an exclusive property or privilege is claimed are defined as follows:

1. Motorized apparatus for the assembly of a louvered structure having a frame and louvers pivotally supported by the frame, each louver comprising a main body portion and smaller diameter rounded louver dowels at opposite ends of the main body portion, the frame comprising side styles with louver dowel receiving openings therealong and end rails held between the styles, said apparatus comprising movable style guides onto which the styles are loaded with the end rails located therebetween, movable louver dowel supports on which the louver dowels are positioned aligned with the dowel receiving openings in the styles, style guide control means for moving said style guides inwardly toward one another to insert the louver dowels into the styles and louver dowel support control means for moving the louver dowel supports away from the louver dowels after an initial and prior to a complete insertion of the louver dowels into the styles.

2. Apparatus as claimed in claim 1, wherein said louver dowel support control means moves said dowel supports away from the louver dowels after the initial and prior to the complete insertion of the louver dowels into the styles during and without interrupting inward movement of said styles guides.

3. Apparatus as claimed in claim 1, wherein said louver dowel supports comprise grooved fingers shaped to receive the rounded louver dowels.

4. Apparatus as claimed in claim 1, wherein said louver dowel supports are individually and selectively positionable in both an in-use supporting position and an out of the way non-use position.

5. Apparatus as claimed in claim 1, wherein said louver dowel supports are individually mounted to a circular support rod by support collars, said support collars being rotatable on said support rod to move said louver dowel supports between an upwardly extending support position and a downwardly extending out of the way position.

6. Apparatus as claimed in claim 1, wherein said louver dowel supports are mounted to vertically movable rods extending lengthwise of said apparatus parallel to said style guides, said apparatus including louver dowel support control means operating to pull said rods downwardly to move said louver dowel supports away from the louver dowels.

7. Apparatus as claimed in claim 6, wherein said louver dowel support control means comprises a piston assembly for moving the rod on which said louver dowel supports are mounted.

* * * * *